(12) United States Patent
Richardson

(10) Patent No.: US 6,832,307 B2
(45) Date of Patent: Dec. 14, 2004

(54) INSTRUCTION FETCH BUFFER STACK FOLD DECODER FOR GENERATING FOLDABLE INSTRUCTION STATUS INFORMATION

(75) Inventor: Nicholas J. Richardson, San Diego, CA (US)

(73) Assignee: STMicroelectronics, Inc., Carrollton, TX (US)

(*) Notice: Subject to any disclaimer, the term of this patent is extended or adjusted under 35 U.S.C. 154(b) by 500 days.

(21) Appl. No.: 09/909,121

(22) Filed: Jul. 19, 2001

(65) Prior Publication Data

US 2003/0046519 A1 Mar. 6, 2003

(51) Int. Cl.[7] .............................................. G06F 9/30
(52) U.S. Cl. ........................ 712/213; 712/210; 712/226
(58) Field of Search ................................ 712/210, 213, 712/226, 23, 200, 206, 208

(56) References Cited

U.S. PATENT DOCUMENTS

| | | | |
|---|---|---|---|
| 5,504,932 A | 4/1996 | Vassiliadis et al. ......... | 712/208 |
| 6,026,485 A | * 2/2000 | O'Connor et al. .......... | 712/226 |
| 6,237,086 B1 | 5/2001 | Koppala et al. ............ | 712/226 |
| 6,301,651 B1 | * 10/2001 | Chang et al. ............... | 712/202 |
| 6,631,459 B1 | * 10/2003 | Cho et al. ................... | 712/210 |

FOREIGN PATENT DOCUMENTS

| WO | WO 97/13193 | 4/1997 |
|---|---|---|

* cited by examiner

*Primary Examiner*—Kenneth S. Kim
(74) *Attorney, Agent, or Firm*—Lisa K. Jorgenson; William A. Munck

(57) ABSTRACT

A plurality of fold decoders are each coupled to a different set of successive entries within an instruction fetch buffer stack and check the contents of the successive entries for a variable number of variable-length instructions which may be folded. Folding information for each of the respective set of entries, identifying a number of instructions therein which may be folded (if any) and a size of each instruction which may be folded, is produced by the fold decoders and stored in the first entry of the set, then transmitted to the main decoder for use in folding instructions during decoding.

20 Claims, 2 Drawing Sheets

INSTRUCTION FETCH BUFFER STACK FOLD DECODER FOR GENERATING FOLDABLE INSTRUCTION STATUS INFORMATION

TECHNICAL FIELD OF THE INVENTION

The present invention is directed, in general, to maximizing instruction throughput in a pipelined processor and, more specifically, to folding instructions.

BACKGROUND OF THE INVENTION

Pipelined processors are capable of concurrently executing several different assembly or machine language instructions by breaking the processing steps for each instruction into several discrete processing phases, each of which is executed by a separate pipeline stage. Each instruction must pass through each processing phase—and therefore each pipeline stage—sequentially to complete execution. Within an n stage pipeline (where "n" is any positive nonzero integer), each instruction requires n processing phases to complete execution, although typically at least one instruction may be completed every clock cycle.

Generally a given instruction requires processing by only one pipeline stage at a time (i.e., within any given clock cycle). Since instructions all use the pipeline stages in the same order, an n stage pipeline is capable of working on n instructions concurrently. The execution rate is thus theoretically n times faster than an equivalent non-pipelined processor in which every phase of execution for one instruction must be completed prior to initiation of processing of another instruction, although pipeline overheads and other factors typically make the actual performance improvement factor somewhat less than n.

As noted, a full pipeline can theoretically complete an instruction every clock cycle. One technique often employed to further increase instruction execution efficiency is folding, a process generally performed by the decode stage and involving combination of two or more program instructions into a single instruction which can be executed more quickly. In a typical case, m instructions (where "m" is any positive nonzero integer), each of which would individually require 1 pipeline cycle to execute, are combined into a single instruction taking only one pipeline cycle total to execute, saving m−1 pipeline cycles.

The folding technique relies upon: (1) the ability of the instruction decoder to extract two or more instructions per clock cycle from the instruction fetch buffer from which the instruction decoder receives instructions, combine instructions (suitably), and forward the resulting single "pseudo" instruction to the operand fetch and execution stages; (2) the ability of the instruction fetch stage to supply (on average) more than one instruction per clock cycle to the instruction fetch buffer so that the instruction fetch buffer normally contains more than one instruction during any given clock cycle, giving the decoder an opportunity to fold instructions; and (3) the ability of the operand fetch and execution stages together to handle operations more complex than those expressed by any individual instruction within the processor's normal instruction set, making possible the combination of instructions into more complex single-cycle operations.

As an example of instruction folding, consider a load and add instruction:

| | |
|---|---|
| ld mem1, R1 | (load contents of memory location mem1 into register R1); |
| add R2, R1 | (add contents of registers R1 and R2 and place the result in register R1). |

These two instructions may be folded into a single load/add pseudo-operation:

| | |
|---|---|
| ld/add mem1, R2, R1 | (add contents of registers R1 and R2 and place the result in register R1), | which potentially takes only half the execution time.

Instruction folding schemes are limited, however, by the complexity of the instruction decoder, which typically must determine whether two or more instructions may be folded within a single clock cycle. To illustrate the problem, consider an instruction set architecture (ISA) of 100 instructions, out of which 10 different instructions may be folded as combined pairs for execution within a particular processor design. In this case, the instruction decoder must examine the first two instructions within the instruction fetch buffer for 100 possible folding combinations out of 10,000 possible combinations of two instructions. For decoders which support folding across more than only two instructions, the number of possible instruction combinations increases exponentially. In any case, such checks will significantly limit the decoder speed.

In practice, therefore, the instruction decode stage must strictly limit the scope of its search for folding combinations among the instructions contained within the instruction fetch buffer in order to complete the decode operation (which includes producing control information for subsequent pipeline stages) in a short period of time, usually one clock cycle. However, these constraints may produce unsatisfactory results, missing many folding opportunities. For instance, a series of instructions including a load, a subtract, and a store:

| | |
|---|---|
| ld mem1, R1 | (load contents of memory location mem1 into register R1); |
| sub R2, R1 | (subtract contents of register R2 from R1 and place the result in register R1); and |
| st R1, mem2 | (store contents of register R1 in memory location mem2) | might be folded into a single-cycle pseudo-instruction:

| | |
|---|---|
| ld/sub/st R2, mem1, R1/mem2 | (subtract contents of R2 from mem1 and place result in R1 and mem2). |

If the instruction decode stage is limited to examining only two instructions within the instruction fetch buffer at a time, only the first two instructions would be folded and the resulting sequence:

| | |
|---|---|
| Ld/sub R2, mem1, R1 | (subtract contents of R2 from mem1 and place result in R1); and |
| st R1, mem2 | (store contents of R1 in mem2) | would require two clock cycles to execute.

There is, therefore, a need in the art for improving instruction folding to allow examination of a greater number of instruction combination permutations for potential folding without impairing instruction decode speed.

SUMMARY OF THE INVENTION

To address the above-discussed deficiencies of the prior art, it is a primary object of the present invention to provide, for use in a processor, a plurality of fold decoders each coupled to a different set of successive entries within an instruction fetch buffer stack and check the contents of the successive entries for a variable number of variable-length instructions which may be folded. Folding information for each of the respective set of entries, identifying a number of instructions therein which may be folded (if any) and a size of each instruction which may be folded, is produced by the fold decoders and stored in the first entry of the set, then transmitted to the main decoder for use in folding instructions during decoding.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art will appreciate that they may readily use the conception and the specific embodiment disclosed as a basis for modifying or designing other structures for carrying out the same purposes of the present invention. Those skilled in the art will also realize that such equivalent constructions do not depart from the spirit and scope of the invention in its broadest form.

Before undertaking the DETAILED DESCRIPTION OF THE INVENTION below, it may be advantageous to set forth definitions of certain words or phrases used throughout this patent document: the terms "include" and "comprise," as well as derivatives thereof, mean inclusion without limitation; the term "or" is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, whether such a device is implemented in hardware, firmware, software or some combination of at least two of the same. It should be noted that the functionality associated with any particular controller may be centralized or distributed, whether locally or remotely. Definitions for certain words and phrases are provided throughout this patent document, and those of ordinary skill in the art will understand that such definitions apply in many, if not most, instances to prior as well as future uses of such defined words and phrases.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, and in which.

DETAILED DESCRIPTION OF THE INVENTION

Figure 1:
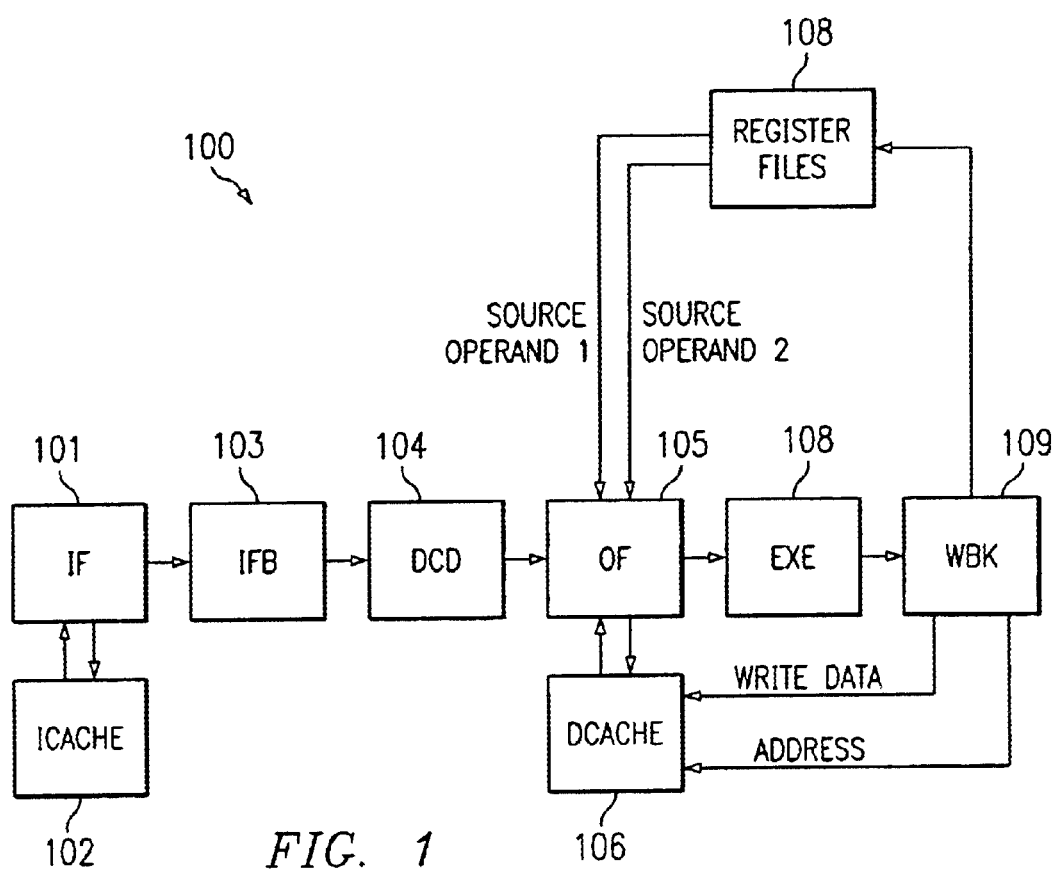
FIG. 1 depicts a processor implementing an instruction folding mechanism according to one embodiment of the present invention.
Figure 2:
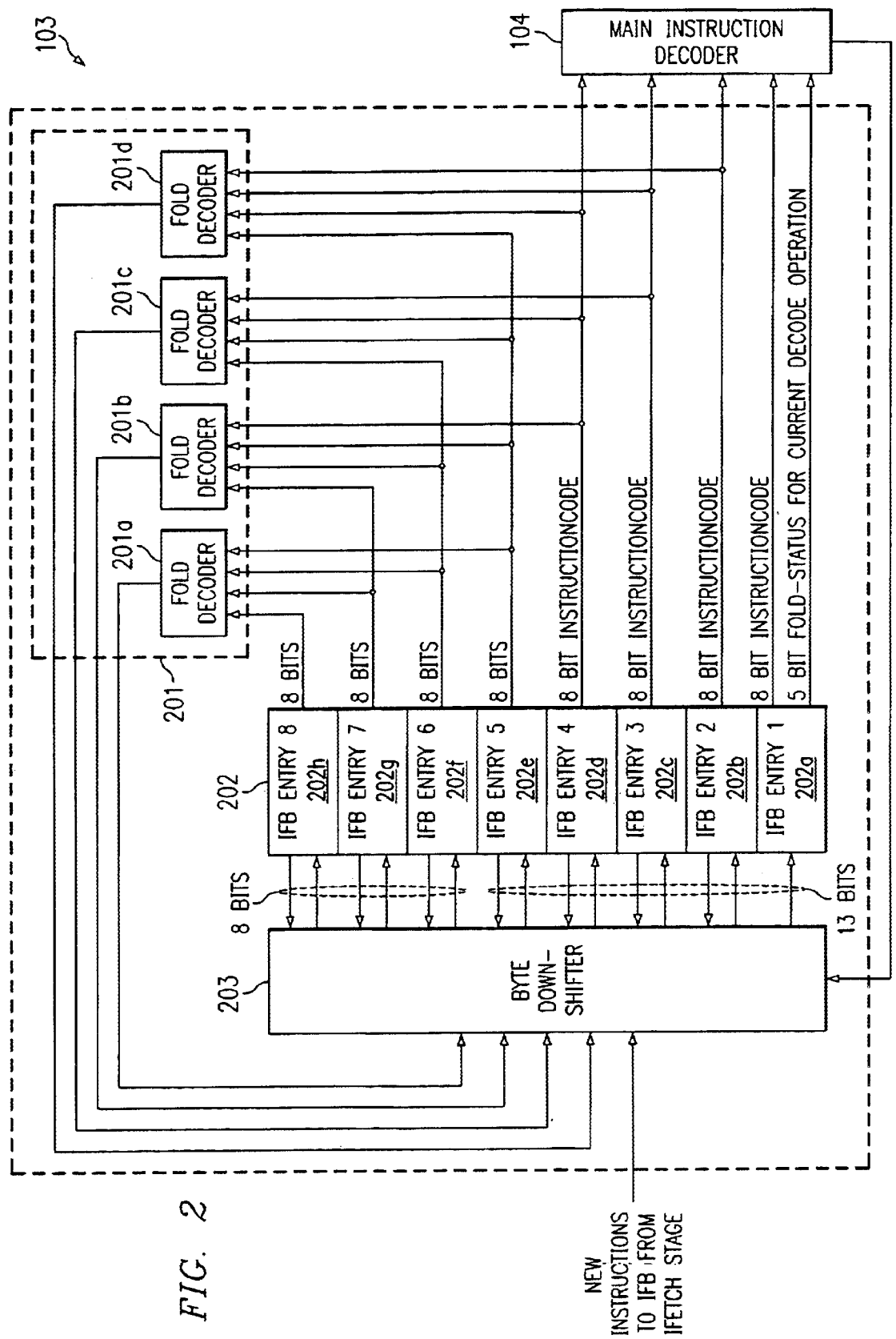
FIG. 2 illustrates in greater detail an instruction pre-decoding and progressive folding mechanism according to one embodiment of the present invention.

FIGS. 1 and 2, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged device.

FIG. 1 depicts a processor implementing an instruction folding mechanism according to one embodiment of the present invention. Since the present invention may be practiced in conjunction with most conventional pipelined processor designs, FIG. 1 does not depict a complete processor or all elements and connections within a processor, but instead only so much of the design for a processor as is either required to understand the present invention and/or unique to the present invention is shown.

Processor 100 includes, within the execution pipeline shown, an instruction fetch (IF) unit 101 which fetches instructions to be executed from an instruction cache (ICACHE) 102 or, on an instruction cache miss, from an external memory, and places fetched instructions in an instruction fetch buffer (IFB) 103. The instruction fetch buffer 103 holds prefetched instructions which have not yet been processed by the decode (DCD) unit 104, acting as an instruction reservoir to avoid the possibility of the execution pipeline running out of instructions to process.

The decode unit 104 takes instructions, usually in a highly compacted and encoded form, from the instruction fetch buffer 103 and decodes such instructions into larger sets of signals which may be used directly for execution by subsequent pipeline stages. After an instruction is decoded, the instruction is removed from the instruction fetch buffer 103. In the present invention, the instruction fetch buffer 103 and/or the decode unit 104 performs pre-decoding and progressive instruction folding as described in further detail below.

The operand fetch (OF) unit 105 fetches operands to be operated on by the instruction during execution, either from the data cache (DCACHE) 106, from an external memory via the data cache 106, or from register files 107. The execution (EXE) unit 108 performs the actual operation (e.g., add, multiply, etc.) on the operands fetched by the operand fetch unit 105 and forms a result for the operation. Those skilled in the art will recognize that processor 100 may optionally include multiple execution units operating in parallel, including different types of execution units (e.g., integer or fixed point, floating point, etc.) and multiple implementations of a particular type of execution unit (e.g., 2–3 integer units). Finally, a write-back (WBK) unit 109 writes the result formed by the execution unit 109 into either the data cache 106 or register files 107.

FIG. 2 illustrates in greater detail an instruction pre-decoding and progressive folding mechanism according to one embodiment of the present invention, and is intended to be read in conjunction with FIG. 1. The progressive folding technique of the present invention exploits the fact that the instruction fetch buffer 103 normally contains more instructions than the instruction decode unit 104 consumes during a given clock cycle since the instruction fetch unit 101 is normally designed to fetch instructions at an average rate slightly higher than such instructions are consumed by the execution pipeline in order to reduce the probability of the execution pipeline becoming starved for instructions to process. An opportunity thus exists to pre-decode the instructions after the instructions have been placed in the instruction fetch buffer 103 and before the instructions are consumed by the decode unit 104. The result of the pre-decode process is one or more pre-decode bits placed in the instruction fetch buffer entry along with the relevant byte of the instruction. When the pre-decoded instruction reaches the head of the instruction fetch buffer 103, the decode unit 104 may employ the pre-decode bits to determine folding properties of that instruction with subsequent instructions quickly enough to allow folding combinations which would not be possible absent the pre-decode bits due to the speed constraints on decode unit 104.

While progressive folding may be implemented in a variety of different fashions, consider, as an example, a processor with an average instruction length of between one and two bytes, as may be the case for an embedded processor with an instruction set encoded for high density. Assume that the processor is capable of folding up to three instructions, occupying a maximum of four bytes, into a single pseudo-instruction such as the load/subtract/store operation described above. However, the decode unit 104 is not capable of folding three instructions in that manner unless the number and length of instructions to be folded is known at the beginning of the clock period during each decode cycle.

In the present invention, the pre-decoder 201 within a progressive fold mechanism 200 supplies information to the decode unit 104 for the instruction at the head 202a of the instruction fetch buffer stack 202 regarding whether the subsequent one or two instructions within the instruction fetch buffer stack 202 may be folded into that instruction, and the length of the instructions in the folded group. Pre-decoder 201 includes a set of four identical fold-decoders 201a–201d each connected to a different set of four consecutive entries within entries 2 through 8 202b–202h of the instruction fetch buffer stack 202. Each fold-decoder 201a–201d looks at folding combinations for a group of four successive bytes and produces five bits of fold status information as follows:

| | |
|---|---|
| bits 0, 1 | fold-count; 00 = no folding, 01 = 2-way folding; 10 = 3-way folding |
| bit 2 | byte-count for first folded instruction (0 = 1 byte, 1 = 2 bytes) |
| bit 3 | byte-count for second folded instruction (0 = 1 byte, 1 = 2 bytes) |
| bit 4 | byte-count for third folded instruction (0 = 1 byte, 1 = 2 bytes) | the above fold-status information by speculatively assuming that the first byte in the group of successive bytes spanned represents the first byte in a group of up to three successive instructions and checks for folding properties of those instructions based upon that assumption. In reality, the first byte input to a given fold-decoder 201a–201d may not be the first (or only) byte of an instruction or of a foldable group of instructions.

Every clock cycle, the four fold-decoders 201a–201d generate the fold-status information described above, which is then added to the instruction fetch buffer stack entry 202b–202e containing the first byte in the group of four bytes spanned. Since one clock cycle is required for the fold-decoders 201a–201d to generate the fold-status information, instructions should reside in the instruction fetch buffer 103 for at least two clock cycles before being removed by the instruction decoder 104. However, the fold-count is initialized to "00" when instructions are first placed in the instruction fetch buffer stack 202 so that no folding will take place in cases where the instruction decoder 104 is removing instructions from the instruction fetch buffer 103 as fast as the instruction fetch unit 101 is placing instructions within the instruction fetch buffer 103.

In cases where instructions are utilized and removed by the instruction decoder 104 during the clock cycle immediately after the instruction was placed in the instruction fetch buffer 103 by the instruction fetch unit 101, there will be insufficient time to generate the folding pre-decode (fold-status) bits. In that case the 5 fold-status field associated with each entry 202a–202h within the instruction fetch buffer stack 202 will indicate that the instruction byte within the corresponding entry 202a–202h has not been pre-decoded, and the decode unit 104 will either not be able to fold instructions or, if the speed of the decode unit 104 permits, will be forced to apply a less optimal folding algorithm. Normally, however, the instruction fetch unit 101 supplies instructions to the instruction fetch buffer 103 at a rate faster than the instructions are consumed by the decode unit 104.

However, the fact that decode unit 104 removes instructions from a near-empty instruction fetch buffer 103 at a slower rate when the instructions have not been preprocessed to determine folding properties means that the instruction fetch unit 101 will then tend to fill up the instruction fetch buffer 103 more quickly (as the lack of folding will slow down the execution pipeline), and therefore the likelihood of the instruction fetch buffer 103 containing sufficient instructions to perform fold pre-decoding is increased in subsequent cycles.

Therefore, the progressive folding mechanism of the present invention is, to an extent, self-regulating, allowing the decode unit 104 to potentially consume more instructions per clock cycle only at times when the instruction fetch unit 101 is operating fast enough to maintain a reasonable full instruction fetch buffer 103, helping to balance the speeds of the instruction fetch and execution pipeline stages.

Every clock cycle, the main instruction decoder 104 examines the first four bytes in the instruction fetch buffer 103 and the fold-status bits associated with the first entry 202a within the instruction fetch buffer stack 202. If bits 0 and 1 of the fold-status bits are "00", then either fold-decoders did not have time to generate fold-status information for that instruction as described above, or the instruction folding rules dictated by the microarchitecture implementation did not allow folding of the instruction group currently at the head of the instruction fetch buffer stack 202, or only one complete instruction was encoded by the first four bytes within the instruction fetch buffer stack 202.

Whatever the case, the main instruction decoder 104 uses the five fold-status bits associated with the first byte within the instruction fetch buffer stack 202 to immediately determine whether folding can be performed, the number of instructions to be folded, and the byte boundaries of instructions to be folded. The instruction decoder 104 then generates control information to be passed to subsequent pipeline stages much more quickly than if the instruction decoder 104 first had to determine whether folding could be performed, and the instruction boundaries for instructions to be folded.

When the main instruction decoder 104 finishes Q decoding the instructions at the head of the instruction fetch buffer stack 202, the decode unit 104 generates a shift count signal to the instruction fetch buffer to remove the completed instructions at the next clock edge. Generation of the shift-count is also faster since the number of bytes in a fold group is given at the start of each decode cycle, reducing another potential critical delay path. When the instruction fetch buffer 103 removes the decoded instructions on the next clock edge, the next group of unprocessed instructions within the instruction fetch buffer 103 are shifted down into the first four bytes of the instruction fetch buffer 103, along with the associated fold-status information, and the decode process is repeated.

The net effect of progressive instruction folding as described is that the instruction decode unit 104 operates at a significantly higher frequency than if progressive folding was not employed. The trade-off is that folding may potentially occur less often when using progressive folding versus a scheme where the main instruction decoder 104 dynamically determines the folding information every clock cycle, since the progressive folding mechanism relies on instructions residing in the instruction fetch buffer 103 for at least one clock cycle before being used, which may not always happen. However, given the frequency improvements enabled, and the potentially greater number of folding combinations which may be checked, a significant net processor performance gain should be realized.

In the above description of one possible implementation of progressive instruction folding, folding is either performed fully or not at all depending on whether the instructions remain within the instruction fetch buffer 103 long enough for the fold-decoders 201a–201d to pre-decode the instructions. In other implementations, the degree of folding—both in terms of the number of instructions folded and the folding combinations supported—may increase with the length of time during which the instructions remain in the instruction fetch buffer 103, exploiting the ability of advanced multi-pass fold-decoders to progressively optimize instruction folding over a number of clock cycles. Furthermore, depending on the target operating frequency, the main instruction decoder 104 may perform some simple instruction folding (either in lieu of or in addition to the folding identified by the fold-status bits), providing a higher base-level of performance for instruction which do not remaining within the instruction fetch buffer 103 sufficiently long to be (fully) pre-decoded by the fold-decoders.

Prior art instruction folding schemes require the main instruction decoder within the decode pipeline stage to dynamically determine potential instruction folding combinations using combinatorial logic, and during the same clock cycle in which the instruction decoder performs the main instruction decode. The progressive instruction folding system of the present invention provides advantages over such prior folding schemes for two reasons: First, since the main instruction decoder must be utilized in the prior art folding scheme to determine the folding combinations and folded instruction boundaries before the instructions can be actually decoded, the prior art solution is subject to the inherently longer critical timing paths in the decode stage while progressive instruction folding as described above eliminates the folding determination logic from the critical path within the decode stage. Thus the overall frequency of the processor, to the extent constrained by the instruction decode time (which is common), may be increased with the present invention, increasing the performance of the processor.

Second, the present invention determines folding information during the clock cycle(s) prior to instructions entering the decode stage so that, unlike prior folding schemes, the fold-decoders may take an entire clock cycle or more to determine folding combinations. Determination of more complex folding combinations is thus enabled, increasing the average number of instructions executed per clock cycle and improving processor performance.

Although the present invention has been described in detail, those skilled in the art will understand that various changes, substitutions, and alterations herein may be made without departing from the spirit and scope of the invention it its broadest form.

What is claimed is:

1. For use in a processor, an instruction handling system for determining instruction folding comprising:
    at least one fold decoder associated with an instruction fetch buffer stack,
    the at least one fold decoder coupled to a set of successive entries within the instruction fetch buffer stack and examining contents within the successive entries prior to a main decode of the contents within the successive entries to determine whether the successive entries contain two or more instructions which may be folded,
    the at least one fold decoder generating fold-status information for the contents within the successive entries indicating whether the successive entries contain two or more instructions which may be folded.

2. The instruction handling system as set forth in claim 1 wherein the at least one fold decoder further comprises:
    a plurality of fold decoders associated with the instruction fetch buffer stack and including the at least one fold decoder,
    each fold decoder coupled to a different set of successive entries within the instruction fetch buffer stack, wherein the different sets of successive entries overlap, and examining contents within a corresponding set of successive entries to determine whether the corresponding set of successive entries contain two or more instructions which may be folded,
    each fold decoder generating fold-status information for the contents within the corresponding set of successive entries indicating whether the corresponding set of successive entries contain two or more instructions which may be folded.

3. The instruction handling system as set forth in claim 2 wherein the fold-status information produced by each fold decoder includes a number of instructions which may be folded and a size of each instruction which may be folded.

4. The instruction handling system as set forth in claim 2 wherein the fold-status information for each set of successive entries is stored in association with the respective set of successive entries within the instruction fetch buffer stack.

5. The instruction handling system as set forth in claim 1 wherein the at least one fold decoder checks the contents within the successive entries for instructions of variable size and for possible folding of a variable number of instructions.

6. The instruction handling system as set forth in claim 1 further comprising:
    a decoder receiving the fold-status information together with the content of the successive entries for translation of the contents of the successive entries into signals which may be operated on by an execution unit.

7. The instruction handling system as set forth in claim 6 wherein the decoder employs the fold-status information during folding of at least the content of the successive entries into a single operation.

8. A processor comprising:
an instruction fetch mechanism retrieving instructions for storage within instruction fetch buffer;
an instruction decode mechanism for translating instructions into signals which may be operated on by at least one execution unit; and
an instruction handling system coupled between the instruction fetch buffer and instruction decode mechanism for determining instruction folding comprising:
at least one fold decoder associated with an instruction fetch buffer stack,
the at least one fold decoder coupled to a set of successive entries within the instruction fetch buffer stack and examining contents within the successive entries prior to a main decode of the contents within the successive entries to determine whether the successive entries contain two or more instructions which may be folded,
the at least one fold decoder generating fold-status information for the contents within the successive entries indicating whether the successive entries contain two or more instructions which may be folded.

9. The processor as set forth in claim 8 wherein the at least one fold decoder further comprises:
a plurality of fold decoders associated with the instruction fetch buffer stack and including the at least one fold decoder,
each fold decoder coupled to a different set of successive entries within the instruction fetch buffer stack, wherein the different sets of successive entries overlap, and examining contents within a corresponding set of successive entries to determine whether the corresponding set of successive entries contain two or more instructions which may be folded,
each fold decoder generating fold-status information for the contents within the corresponding set of successive entries indicating whether the corresponding set of successive entries contain two or more instructions which may be folded.

10. The processor as set forth in claim 9 wherein the fold-status information produced by each fold decoder includes a number of instructions which may be folded and a size of each instruction which may be folded.

11. The processor as set forth in claim 9 wherein the fold-status information for each set of successive entries is stored in association with the respective set of successive entries within the instruction fetch buffer stack.

12. The processor as set forth in claim 8 wherein the at least one fold decoder checks the contents within the successive entries for instructions of a variable size and for possible folding of a variable number of instructions.

13. The processor as set forth in claim 8 wherein the instruction decode mechanism receives the fold-status information together with the contents of the successive entries.

14. The processor as set forth in claim 8 wherein the instruction decode mechanism employs the fold-status information during folding of at least the contents of the successive entries into a single operation.

15. For use in a processor, a method of determining instruction folding comprising:
prior to decoding contents within a set of successive entries within an instruction fetch buffer stack,
examining the contents within the successive entries to determine whether the successive entries contain two or more instructions which may be folded; and
generating fold-status information for the contents within the successive entries indicating whether the successive entries contain two or more instructions which may be folded.

16. The method as set forth in claim 15 wherein the step of examining the contents within the successive entries to determine whether the successive entries contain two or more instructions which may be folded further comprises:
examining contents within each of a different set of successive entries within the instruction fetch buffer stack, wherein the different sets of successive entries overlap, to determine whether the corresponding set of successive entries contain two or more instructions which may be folded.

17. The method as set forth in claim 16 wherein the step of generating fold-status information for the contents within the successive entries indicating whether the successive entries contain two or more instructions which may be folded further comprises:
generating fold-status information for the contents within each set of successive entries indicating whether the corresponding set of successive entries contain two or more instructions which may be folded, wherein the fold-status information includes a number of instructions which may be folded and a size of each instruction which may be folded.

18. The method as set forth in claim 16 further comprising:
storing the fold-status information for each set of successive entries in association with the respective set of successive entries within the instruction fetch buffer stack.

19. The method as set forth in claim 15 wherein the step of examining contents within each of a different set of successive entries within the instruction fetch buffer stack further comprises:
checking the contents within the successive entries for instructions of a variable size and for possible folding of a variable number of instructions.

20. The method as set forth in claim 15 further comprising:
transmitting the fold-status information together with the contents of the successive entries to an instruction decoder translating the contents of the successive entries into signals which may be operated on by an execution unit; and
employing the fold-status information during folding of at least the content of the successive entries into a single operation within the instruction decoder.

* * * * *